United States Patent [19]

Burtnett

[11] 4,215,237
[45] Jul. 29, 1980

[54] BUS CONDUCTOR SUPPORT SYSTEM

[75] Inventor: Thomas C. Burtnett, Woodlyn, Pa.

[73] Assignee: General Electric Company, Philadelphia, Pa.

[21] Appl. No.: 881,330

[22] Filed: Feb. 27, 1978

[51] Int. Cl.² .......................... H02G 5/06; H01B 17/18
[52] U.S. Cl. .................................. 174/99 B; 174/169; 174/171; 248/74 R
[58] Field of Search ................. 174/16 B, 99 R, 99 B, 174/99 E, 129 B, 133 B, 149 B, 168, 169, 171; 361/378; 248/65, 74 R; 403/233, 234

[56] References Cited

U.S. PATENT DOCUMENTS

| 1,252,353 | 1/1918 | Liversidge | 174/171 X |
| 2,026,260 | 12/1935 | Tarbox | 248/74 R X |
| 2,972,005 | 2/1961 | Brealey, Jr. et al. | 174/99 B |
| 2,975,997 | 3/1961 | Lindsey | 174/169 X |
| 3,042,353 | 7/1962 | O'Mara | 248/74 R |
| 3,623,687 | 11/1971 | Nordstrom | 248/74 R |
| 3,809,801 | 5/1974 | Niemoller et al. | 174/99 B |

FOREIGN PATENT DOCUMENTS

| 1239417 | 7/1960 | France | 174/99 B |
| 1331458 | 5/1963 | France | 248/74 R |
| 625382 | 9/1961 | Italy | 248/74 R |
| 652676 | 5/1951 | United Kingdom | 248/74 R |
| 835605 | 5/1960 | United Kingdom | 248/74 R |

Primary Examiner—Laramie E. Askin
Attorney, Agent, or Firm—William Freedman; Carl L. Silverman

[57] ABSTRACT

A bus conductor support system includes a tubular bus conductor removably mounted on an insulator assembly in a hollow conductive tubular enclosure. The tubular enclosure is secured to a mounting platform. Access openings are provided in the tubular enclosure for servicing purposes. One end of the insulator assembly is removably secured to the hollow tubular enclosure in a manner which allows easy access thereto through an access opening in the tubular enclosure. The bus conductor is removably mounted on an opposing end of the insulator assembly in a manner which also allows easy access thereto through the same access opening in the tubular enclosure. In one embodiment, a single side access opening in the tubular enclosure is in proximate relation to securing means for the insulator assembly and mounting means for the bus conductor. The bus conductor is mounted on the insulator assembly through a structure in which no holes are required in the bus conductor, thereby minimizing bus conductor processing and alignment constraints.

7 Claims, 8 Drawing Figures

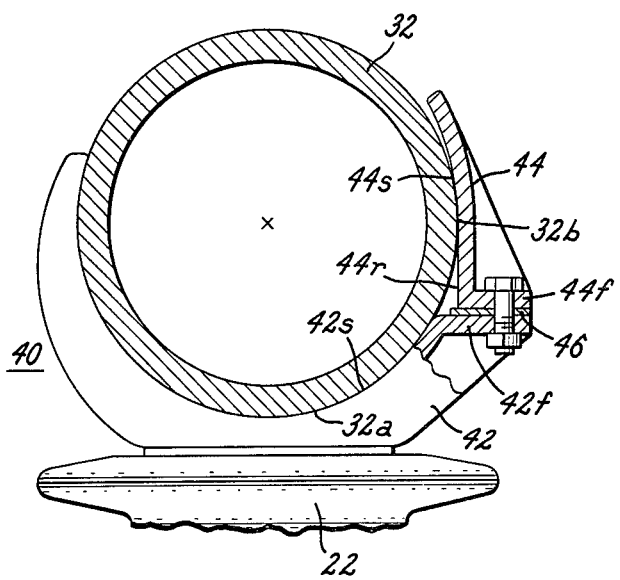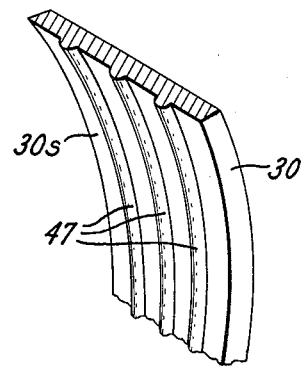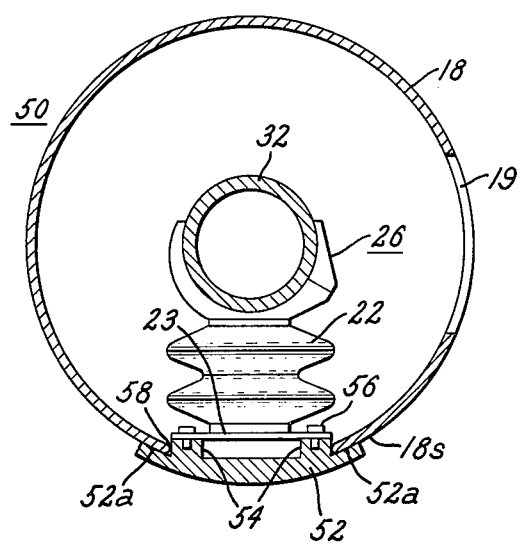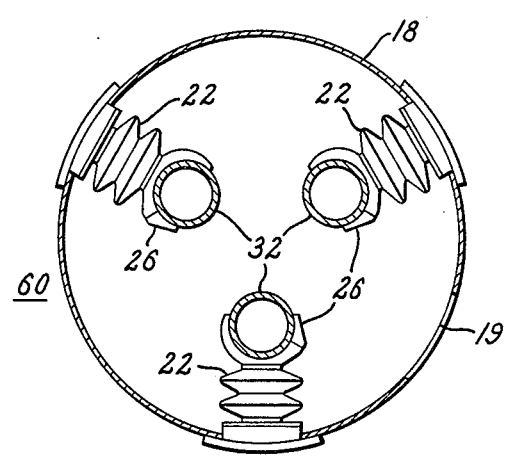

BUS CONDUCTOR SUPPORT SYSTEM

BACKGROUND OF THE INVENTION

The present invention relates to bus conductor support systems, and particularly to a system in which improved accessibility is provided.

Various bus conductor support systems have been disclosed heretofore. In a typical support system, a bus conductor is secured to an insulator assembly and mounted within a grounded hollow enclosure. The insulator assembly insulates the bus conductor from the grounded enclosure and provides support therefor. Mounting hardware is provided for securing the insulator assembly to the enclosure. The enclosure, including its contents, is secured to a mounting platform. In most prior art bus conductor support systems, the bus conductor is provided with access and mounting holes through which mounting hardware e.g., threaded bolts, can be inserted for mounting the bus conductor on the insulator assembly. For servicing purposes, the enclosure is also provided with access openings. The enclosure access openings are generally disposed in a position in line with the bus conductor access openings. Exemplary bus conductor support systems are shown in U.S. Pat. No. 3,809,801, entitled "Post-Type Insulator Assembly for Enclosed Electric Bus", issued to Niemoller et al on May 7, 1974, and U.S. Pat. No. 2,972,005, entitled "Isolated Phase Bus Duct Apparatus", issued to Brealey, Jr., et al on Feb. 14, 1961, and assigned to the assignee of the present application.

Although the bus conductor support systems heretofore discussed are satisfactory for many applications, they do suffer from certain problems. One problem is that it is generally undesirable from a manufacturing standpoint to provide the necessary access and mounting holes in the bus conductor structure. Another problem is that, in such a structure, access to the insulator assembly and its mounting hardware for servicing and/or removal is often difficult to achieve. Additional access openings could be provided in the enclosure, i.e., one opening for access to the mounting hardware associated with the bus conductor and another opening for access to the mounting hardware associated with the insulator assembly structure. However, this approach is undesirable from a manufacturing standpoint as it requires additional access openings in the enclosure. Another problem is that the access and mounting holes in the bus conductor, and the mounting system associated therewith, impose substantial constraints upon assembly of the systems. More particularly, in such a structure, the bus conductors must be carefully aligned with the associated insulator assembly. Indeed, if not properly aligned, proper mounting and securing of the bus conductor becomes very difficult. This problem can be better appreciated by referring to a support system in which the bus conductor and the enclosure are tubularly shaped. In such a system, for proper securing of the bus conductor to the insulator assembly, the mounting holes in the bus conductor must align with the mounting hardware associated with the insulator assembly both longitudinally and angularly.

Accordingly, a general object of the present invention is to provide a bus conductor support system which provides improved accessibility to the bus conductor and insulator assembly.

Another object of the present invention is to provide such a bus conductor support system in which bus conductor alignment constraints are reduced.

Another object of the present invention is to provide a bus conductor support system in which the bus conductor is mounted on an insulator assembly without the need for holes in the bus conductor.

SUMMARY OF THE INVENTION

In carrying out my invention in one form, I provide a bus conductor support system with a hollow enclosure having at least one access opening therein. Platform means are provided for supporting the enclosure in a fixed position. At least one bus conductor is disposed within the tubular enclosure in electrically insulating relation therewith. At least one insulator assembly is disposed within the enclosure for supporting the bus conductor. Insulator assembly securing means is provided for removably securing an end portion of the insulator assembly in a fixed position with respect to the enclosure. The insulator assembly securing means is disposed in proximate relation to the enclosure access opening. Bus conductor mounting means is provided for removably mounting the bus conductor on an opposing end portion of the insulator assembly. The bus conductor mounting means is in abutting relation with at least a portion of the outer surface of the bus conductor for applying restraining forces to the bus conductor at points distributed over greater than one half the perimeter of the outer surface. The bus conductor mounting means includes a detachable portion. The detachable portion is an operating member which is capable of causing the restraining forces to be applied to the bus conductor. The operating member is in proximate relation to the access opening.

BRIEF DESCRIPTION OF THE DRAWINGS

My invention will be more fully understood and its several objects and advantages further appreciated by referring now to the following description, taken in conjunction with the accompanying drawings, wherein:

FIG. 5 is a partially sectioned view, taken as in FIG. 3, showing another form of the present invention.

FIG. 6 is a perspective view showing a portion of one form of mounting member suitable for use in the present invention.

FIG. 7 is a partially sectioned view, taken as in FIG. 1, showing a portion of another form of bus conductor support system of the present invention.

FIG. 8 is a partially sectioned view, taken as in FIG. 1, showing another form of bus conductor support system of the present invention.

DETAILED DESCRIPTION OF THE INVENTION

Figure 1:
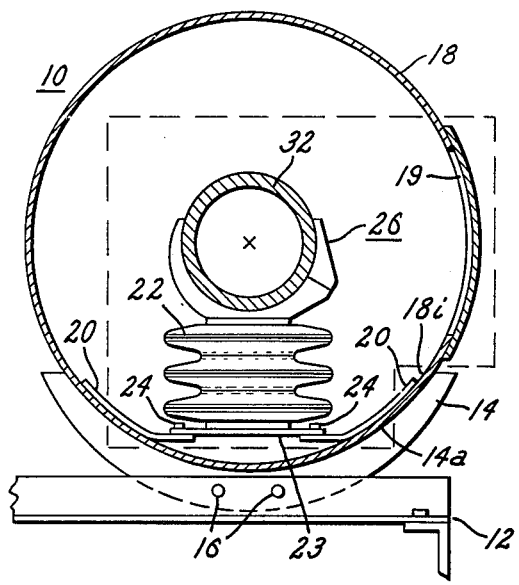
FIG. 1 is a partially sectioned view showing one form of bus conductor support system of the present invention.
Figure 2:
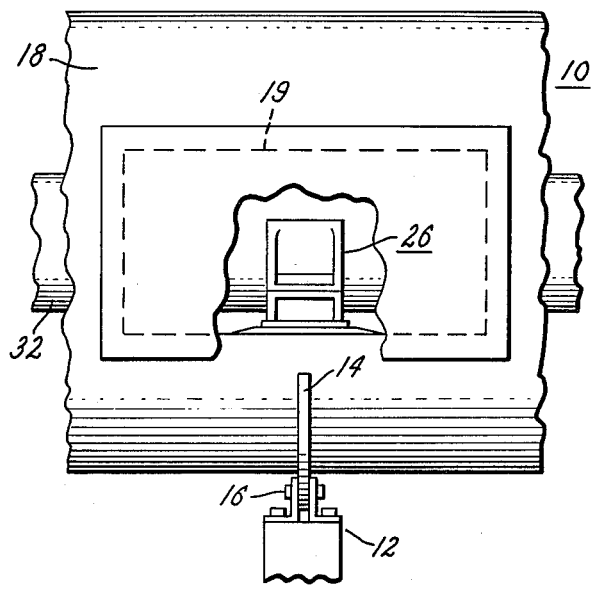
FIG. 2 is a partially broken away side elevational view of the bus conductor support system of FIG. 1.

Referring initially to FIGS. 1 and 2, a bus conductor support system of the present invention is generally designated 10. The system 10 includes a conventional beam type mounting platform 12. A mounting bracket 14, preferably of a conductive material such as aluminum, is secured to the mounting platform 12 through the use of bolts 16.

The mounting bracket 14 includes a surface 14a which is of a curved shape so as to be suitable for supporting a hollow tubular enclosure 18 in fixed position on the mounting platform 12. Typically, the surface 14a is joined to the tubular enclosure 18 through a weld joint. An insulator assembly mounting platform 20 is provided inside the tubular enclosure 18. More particularly, the insulator assembly mounting platform 20 is secured to the inner surface 18i of the enclosure 18 through a weld joint. The insulator assembly mounting platform 20 shown in FIG. 1 includes two portions, each of which includes apertures having internal threads adapted to receive threaded bolts.

Figure 3:
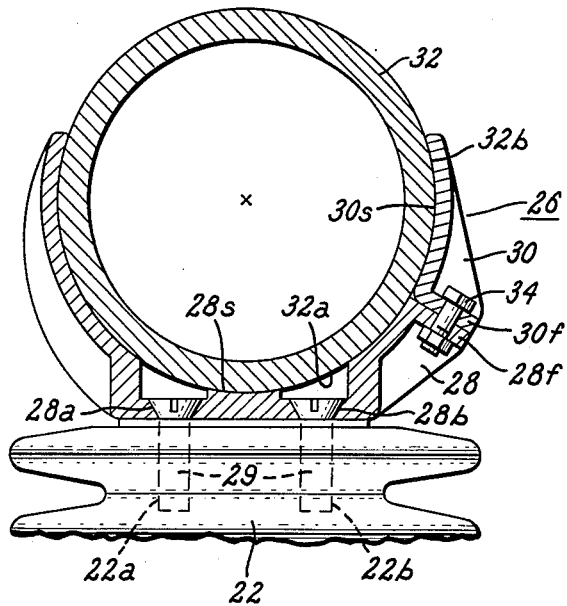
FIG. 3 shows a portion of the bus conductor support system of FIG. 1 in more detail.
Figure 4:
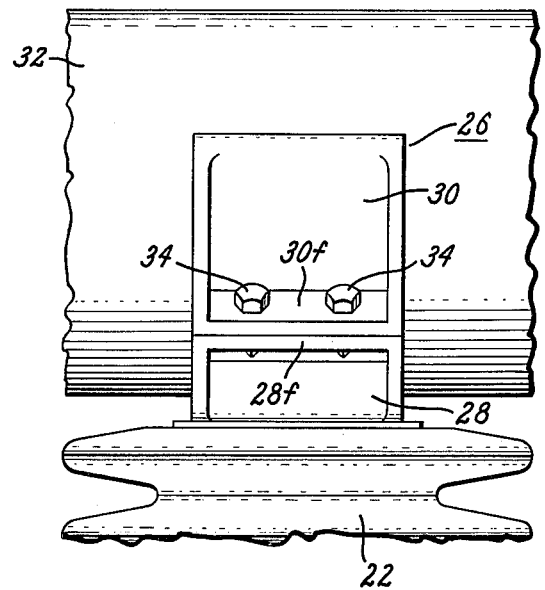
FIG. 4 is a side elevation view of the portion of bus conductor support system shown in FIG. 3.

The description will now continue in connection with the structure which is shown in FIG. 1 as being included within the dashed line region. An insulator assembly 22 with a resilient insulator plate 23 fastened to one end is removably secured to the mounting platform 20. Hence, the insulator assembly 22 is secured in a fixed position with respect to the enclosure 18. More particularly, in the exemplary structure of FIG. 1, bolts 24 are inserted through apertures in the plate 23 and into the mounting platform apertures. For purposes of convenience, the term "insulator assembly securing means" will sometimes be employed to designate that structure through which the assembly 22 is secured in fixed relation with respect to the enclosure 18. The insulator assembly 22 may comprise an insulating material such as porcelain. Bus conductor supporting structure 26 is secured to the opposing end of insulator assembly 22. The conductor supporting structure 26 can be seen more clearly in FIGS. 3 & 4. The supporting structure 26 includes a lower supporting member 28 and an upper supporting member 30. Typically, the supporting member comprises a metal such as aluminum. The lower member 28 includes two recessed apertures 28a and 28b aligned with insulator assembly apertures 22a and 22b through which threaded bolts 29 are inserted, thereby removably securing mounting member 28 to the insulator assembly 22.

The lower mounting member 28 includes an arcuate bus conductor restraining surface 28s which is adapted to receive a tubular bus conductor 32. More particularly, the arcuate surface 28s generally conforms to and abuts a portion 32a of an outer surface of the tubular bus conductor 32 thereby providing at least some support for the bus conductor 32. The upper mounting member 30 is movable, i.e., detachable from the structure 26, and includes an arcuate bus conductor restraining surface 30s which generally conforms to, and abuts another portion 32b of the outer surface of the bus conductor 32. The lower and upper mounting members 28 and 30 each respectively includes flanged portions 28f and 30f which are shown in abutting relation. The flanged portions 28f and 30f include aligned apertures through which conventional nut-bolt combination(s) 34 can be inserted.

Referring to the structure shown in FIGS. 1–4, it is to be noted that the lower and upper conductor mounting members 28 and 30 are in combined abutting relation with greater than one half of the perimeter of the outer surface of the bus conductor 32 so as to provide suitable securing area for applying restraining forces to the bus conductor. That is, the abutting relation between the bus conductor supporting structure 26 and the bus conductor 32 continues for more than 180° of the full 360° bus conductor circumference. It is to be further noted that when the nut-bolt-combination 34 is fully tightened, the flanged portions 28f and 30f are drawn together and the bus conductor 32 is securely (and removably) mounted on the insulator assembly 22. (It can be observed that, when the appropriate mounting hardware is employed to secure all of the elements of the previously described bus conductor support system, the result is that the elements are fixedly disposed in position).

For purposes of convenience of description, the movable upper mounting member 30 will hereinafter be sometimes referred to as an "operating member". By the term, "operating member", it is meant a member which will generally be movably employed to cause the bus conductor mounting structure 26 to function, i.e., to mount or dismount the bus conductor 32.

Referring again to FIGS. 1 and 2, it is to be noted that the conductor mounting structure 26 and the insulator assembly 22 are both accessible from a single access opening, designated 19, which is located on the side of the tubular enclosure 18. More particularly, both the operating member for mounting/dismounting the bus conductor 32 and the bolts 24 which secure the insulator assembly 22 to the enclosure 18 are accessible through the single enclosure access opening 19. Thus, in an instance in which the bus conductor 32 is to be moved or serviced, one need simply manipulate the nut-bolt combination 34 so as to loosen or remove the operating member, i.e., upper conductor mounting member 30. Similarly, in a case where the insulator assembly 22 is to be serviced and/or replaced, the same enclosure access opening 19 is suitable. More particularly, if the bus conductor 32 is moved up, the lower conductor mounting member 28 and its securing bolts 29 are exposed. The securing bolts 29 can then be removed through the use of the same enclosure access opening 19. In order to remove the insulator assembly 22, the bolts 24 which mount the insulator assembly 22 to the mounting platform 20 can then be removed through the use of the same enclosure access opening 19.

Thus, there is provided by the present invention, a bus conductor support system having improved accessibility. More particularly, in the bus conductor support system hereinbefore described, a single access opening in the hollow tubular enclosure provides access to both the bus conductor as well as the insulator assembly associated therewith.

It is to be noted that the bus conductor support system hereinbefore described does not require any holes in the bus conductor itself. Instead, the bus conductor is securely mounted through a clamping type structure. This conductor mounting structure provides increased flexibility in assembling or reworking, as longitudinal and/or radial alignment of bus conductor holes and mounting platform holes is not involved. Improved flexibility in assembly is provided, as the position of the bus conductor in the conductor mounting member is no longer critical. Indeed, the bus conductor can be rotated about its longitudinal axis or moved in directions along its longitudinal axis. The flexibility of the bus conductor support system of the present invention is to be distinguished from the alignment problems inherent in bus conductor support systems of the prior art which involve bus conductors and mounting platforms having holes therein.

Referring now to FIG. 5, a portion of another bus conductor mounting structure of the present invention is generally designated 40. The conductor mounting structure 40 is substantially the same as the mounting structure 26 of FIGS. 1 and 3 in that it also includes two mounting members. In the embodiment of FIG. 5, the lower mounting member is designated 42 and the movable upper mounting member is designated 44. Unchanged elements employ the same reference numerals as in FIGS. 1-4. The lower mounting member 42 has a surface 42s which abuts with a portion 32a of an outer surface of the bus conductor 32. The lower mounting member 42 and the movable upper mounting member 44 respectively include flanged portions 42f and 44f. The upper mounting member 44 includes a surface 44s which is in abutting relation with another portion 32b of the outer surface of the bus conductor 32. However, in contrast to the bus conductor mounting member of FIGS. 1-4, the surface 44s of the upper mounting member 44 is not completely in abutting relation with the bus conductor 32. Instead, the upper mounting member 44 includes a surface 44r which is disposed substantially perpendicularly to the flange 42f of the lower mounting member 42. This configuration of the upper mounting member 44 may be desirable in that it requires less processing to obtain as compared to the more curved mounting member 30 of FIGS. 1-4. In order to provide a "slip fit" wherein the bus conductor 32 is held in place by the upper clamping member 44, but permitted to move longitudinally, a spacer 46 may be provided between the flanges 42f, 44f. The spacer 46 functions to make the clamping diameter slightly larger than the outside diameter of the bus conductor 32. The slip fit can also be provided without the use of the spacer 46. For example, as long as the upper mounting member 44 is of a configuration, which, when secured to the lower mounting member 42, provides clearance between the upper mounting member 44 and the bus conductor 32, a slip fit will be provided.

In connection with the bus conductor structures hereinbefore discussed, for increased bus conductor mounting security, it may be desirable to provide additional abutting surface area in the mounting structure. One technique is to increase the abutting surfaces so as to ensure that restraining forces are applied at points distributed over greater than one half of the perimeter of the bus conductor outer surface. In this connection, an extremely strong bus conductor mounting structure (not shown) may include an upper mounting member which extends over and abuts with the entire remaining portion of the bus conductor which is not abutted by the lower mounting member. Also, it is to be appreciated that it is not necessary that the mounting structure continuously abut with, and conform to, the bus conductor as long as the mounting structure includes sufficient abutting surfaces for applying the necessary bus conductor restraining forces. Indeed, from a construction viewpoint, it is simpler to provide the latter type of mounting structure.

For some non-slip-fit applications wherein the bus conductor is secured in substantially fixed position, the abutting surfaces of the conductor mounting structure may include structure(s) designed to prevent longitudinal slipping of the bus conductor. For example, as shown in FIG. 6, serrations 47 may be provided in the abutting restraining surface 30s of the mounting member 30. The serrations 47 are preferably orthogonally disposed with respect to the longitudinal axis of the tubular bus conductor (not shown). Another technique suitable for non-slip-fit applications is to fixedly join, i.e., tack weld, one mouting member to the bus conductor. For example, the movable upper mounting member can be tack welded to the bus conductor.

In addition, although the conductor mounting structure has hereinbefore been described as being of aluminum, other materials, such as brass, are stronger and may be suitable for certain applications. Further, combinations of materials, such as aluminum-brass, may be suitable for certain applications.

A portion of another form of bus conductor support system of the present invention is shown in FIG. 7 and is generally designated 50. The support system 50 is substantially similar to the support system 10 of FIG. 1 so that, where possible, like reference numerals have been employed to represent like elements. The support system 50 however, includes several modifications in connection with insulator assembly securing means, i.e., the components employed to secure the insulator assembly 22 in a fixed position with respect to the tubular enclosure 18. More particularly, in the system 50, an insulator assembly mounting platform 52 includes opposing arcuate surface portions 52a having a curvature closely matching the curvature of the outer surface 18s of the tubular enclosure 18. A plurality of lugs 54 extend upwardly from the assembly mounting platform 52 and include internal threads for receiving threaded bolts 56. The tubular enclosure 18 includes an aperture 58 through which the lugs 54 are inserted. In this inserted position, as shown in FIG. 7, the insulator assembly mounting platform 52 is welded to the tubular enclosure 18. The insulator assembly 22 and resilient insulator plate 23 are then mounted as previously discussed in connection with FIG. 1. An advantage of the bus conductor support system 50 of FIG. 7 is that the bulk of the insulator assembly mounting platform 52 is outside the tubular enclosure 18 so that additional space is provided within the enclosure. Thus, where additional strength is desired from the bus conductor mounting structure, the mounting structure hereinbefore described in connection with FIGS. 1-5 can be made larger, and hence stronger, without the need to employ stronger materials. This may be desirable as the conductor mounting structure can then be constructed out of greater amounts of relatively inexpensive materials, such as aluminum.

Although the bus conductor support system of the present invention has been hereinbefore described in connection with isolated phase bus conductors, it is also applicable to non-isolated phase bus conductors. For example, one form of bus conductor support system for use with non-isolated phase bus is shown in FIG. 8 and is generally designated 60. Where possible, like reference numerals have been employed to represent like elements. As shown in FIG. 8, conductor mounting structure 26 is separately provided for each bus conductor 32. Each bus conductor 32 can be removed by simply manipulating the movable conductor mounting member as described previously in connection with the structures shown in FIGS. 1-7. Note that accessibility to each bus conductor 32 in the non-isolated system of FIG. 8 is provided through the single enclosure access opening 19. Similarly, each insulator assembly 22 is accessible for servicing and removing purposes through the single enclosure access opening 19.

Also, although the present invention has been described in connection with tubularly shaped bus conductors and enclosures, other bus conductor/enclosure configurations may be employed. For example, a square cross section bus conductor may be employed (not shown). In such a case, bus conductor mounting structure would have to be provided which would be capable of applying the appropriate restraining forces to the bus conductor.

While I have shown and described particular embodiments of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. A bus conductor support system comprising:
   (a) a hollow tubular enclosure,
   (b) platform means for supporting said enclosure in a fixed position,
   (c) a tubular bus conductor disposed within said enclosure in substantially parallel relationship therewith and electrically insulated therefrom,
   (d) an insulator assembly disposed within said tubular enclosure supporting said bus conductor and extending radially of said tubular enclosure along a predetermined diameter of said enclosure,
   (e) a side-located access opening in said tubular enclosure disposed at one side of said insulator assembly,
   (f) insulator assembly securing means removably securing an end portion of said insulator assembly in a fixed position with respect to said enclosure, said insulator assembly securing means being in proximate relation to said side-located access opening;
   (g) bus conductor mounting means removably mounting said bus conductor on an opposing end portion of said insulator assembly without requiring any holes in said bus conductor, said mounting means being in abutting relation with at least a portion of an outer surface of said bus conductor for applying restraining forces to said bus conductor at points distributed over greater than one half of the perimeter of said outer surface, said mounting means including:
   ($g_1$) a first mounting member which is detachably secured to said opposing end portion of said insulator assembly, said first mounting member including an arcuate restraining surface which is in abutting relation with at least a portion of the outer surface of said bus conductor, said first mounting member including a flanged portion extending from said arcuate surface, said first mounting member providing at least some support for said bus conductor;
   ($g_2$) a second mounting member including a restraining surface which is in abutting relation with another portion of the outer surface of said bus conductor, said second mounting member including a flanged portion extending from its restraining surface in juxtaposition to said flanged portion of said first mounting member;
   ($g_3$) means for securing said second mounting member to said first mounting member, said securing means for said mounting members being located in its entirety at one side only of said bus conductor and in proximate relation to said side-located access opening, said latter securing means extending between said flanged portions.

2. A bus conductor support system in accordance with claim 1 in which said restraining surface of said second mounting member is arcuate and in which said arcuate restraining surfaces of said first and second mounting members are in abutting relation with greater than one half of the perimeter of said outer surface of said bus conductor.

3. A bus conductor support system in accordance with claim 1 in which said bus conductor mounting means mounts said bus conductor on said insulator assembly in slip-fit manner wherein said bus conductor is movable along its longitudinal axis.

4. A bus conductor support system in accordance with claim 1 in which said bus conductor mounting means mounts said bus conductor on said insulator assembly in non-slip-fit manner wherein said bus conductor is secured in substantially fixed position.

5. A bus conductor support system in accordance with claim 4 in which at least a portion of said restraining surfaces of said mounting means includes serrations disposed generally orthogonally to the longitudinal axis of said bus conductor.

6. A bus conductor support system in accordance with claim 1 in which said tubular enclosure includes an aperture receiving a component of said insulator assembly securing means, said component including opposing arcuate surface portions joined to an outside surface of said enclosure, said component including portions projecting into said enclosure for removably receiving said end portion of said insulator assembly.

7. A bus conductor support system in accordance with claim 1 in which said tubular enclosure includes an aperture receiving a component of said insulator assembly securing means, said component including opposing arcuate surface portions welded to an outside surface of said enclosure with said arcuate surface portions closely matching the curvature of the outer surface of the tubular enclosure, said component including a plurality of internally threaded lugs projecting into said enclosure removably receiving said end portion of said insulator assembly wherein the bulk of said insulator assembly securing means is disposed outside said enclosure.

* * * * *